3,207,174
FLUID COOLED VALVE
Frank A. Berczynski, Willow Springs, Ill., assignor to John Mohr & Sons, Chicago, Ill., a corporation of Illinois
Filed Apr. 15, 1963, Ser. No. 273,183
5 Claims. (Cl. 137—315)

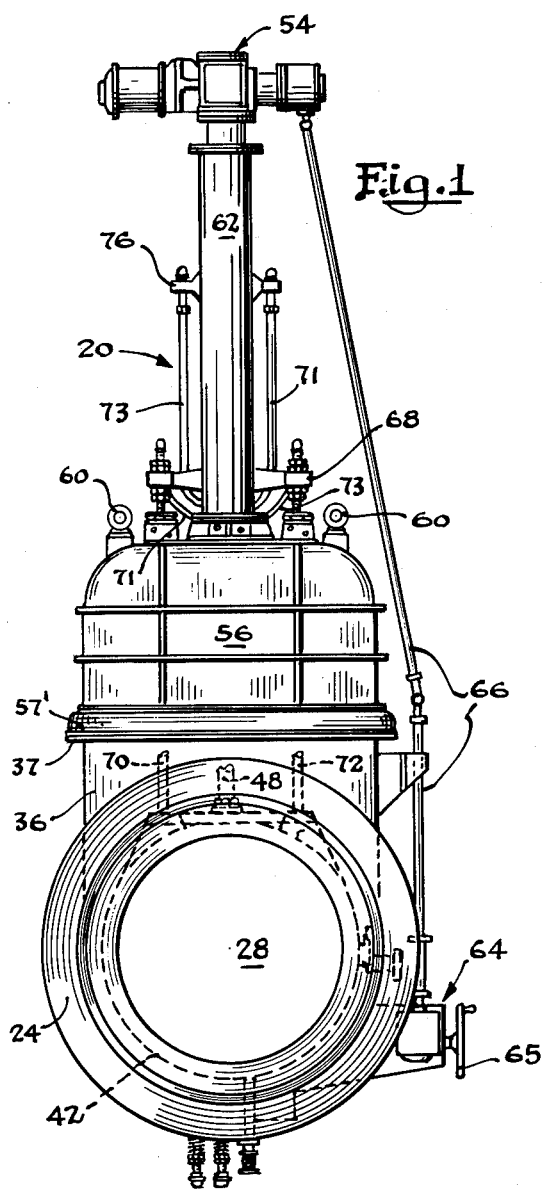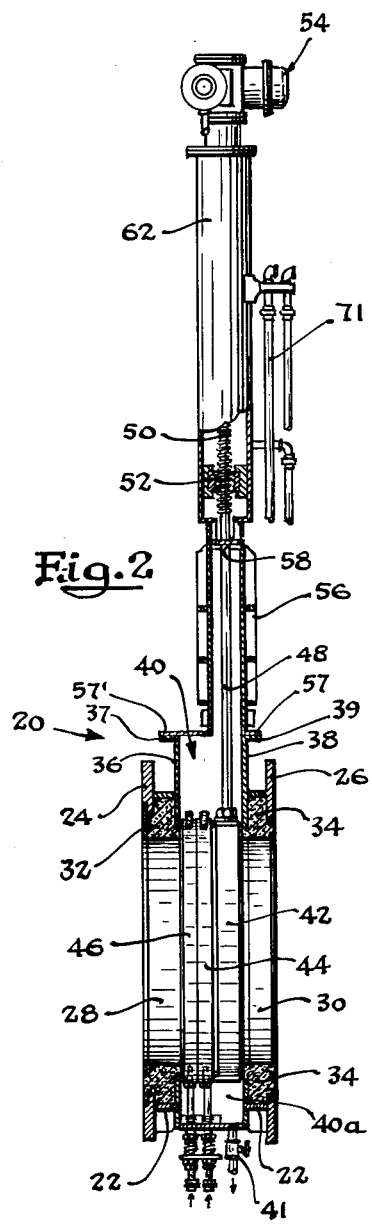

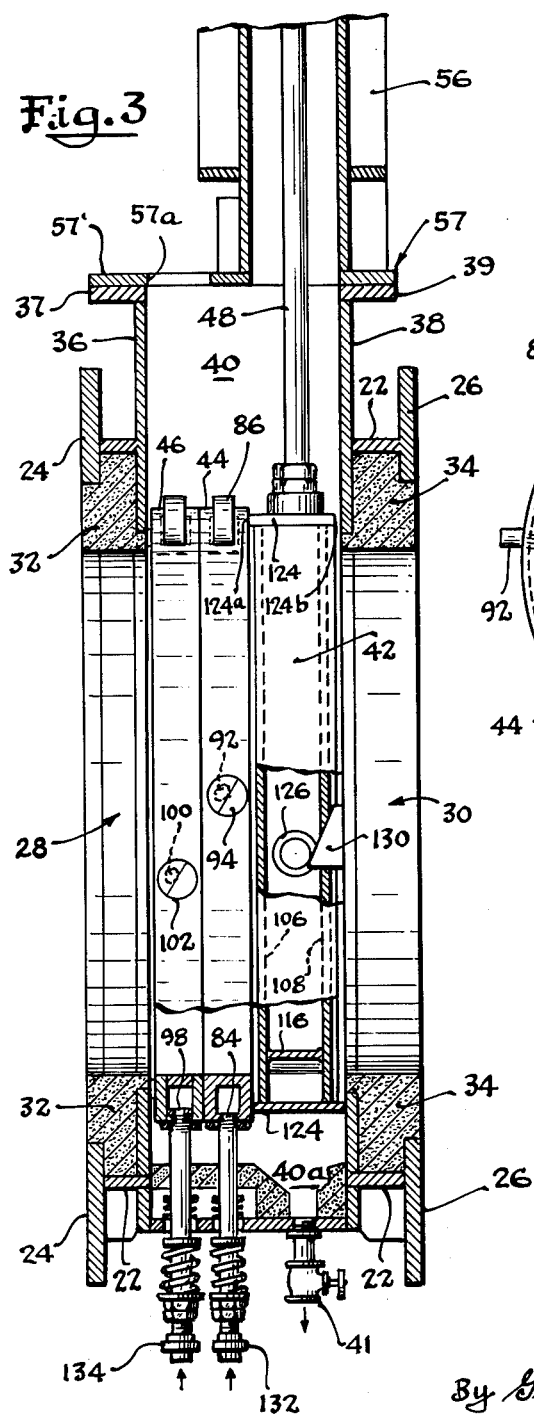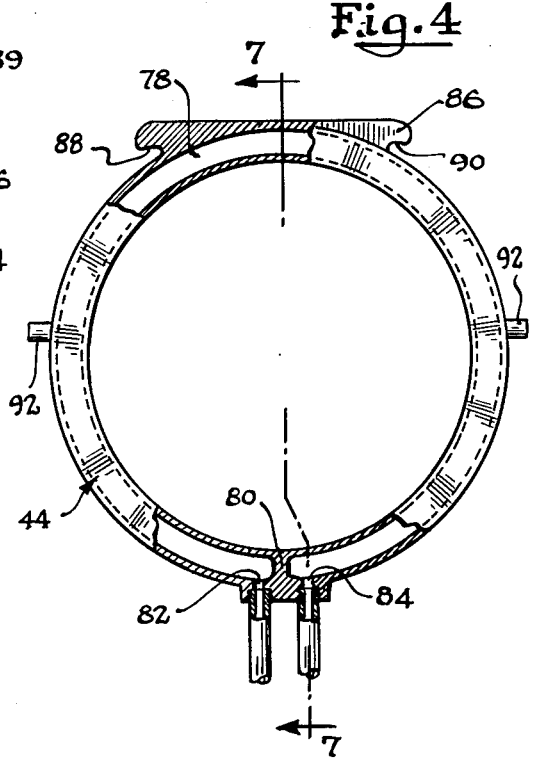
Inventor
FRANK A. BERCZYNSKI
By George E. Frost - Keith J. Kulie
Attorneys

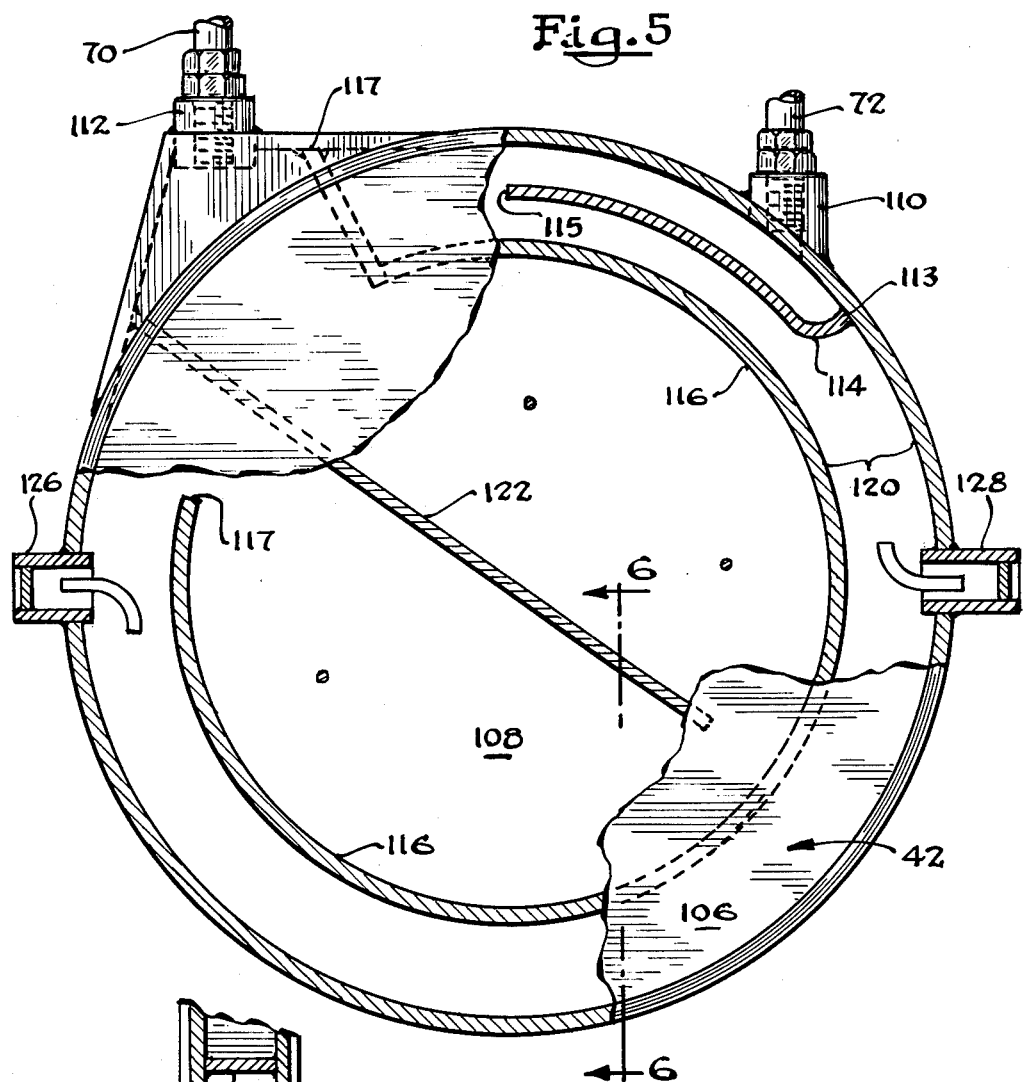
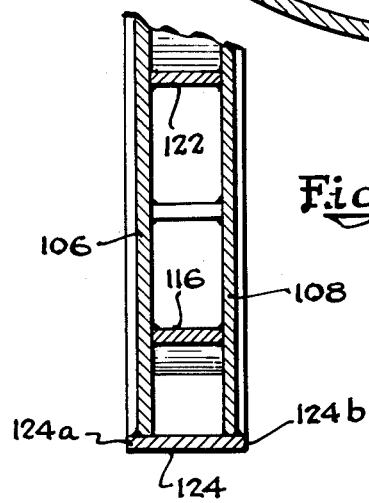

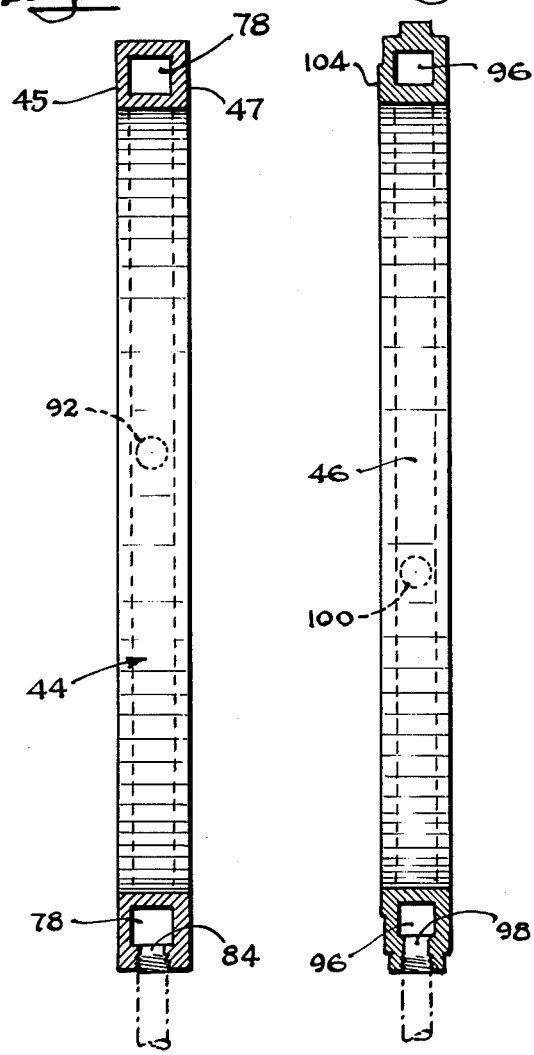
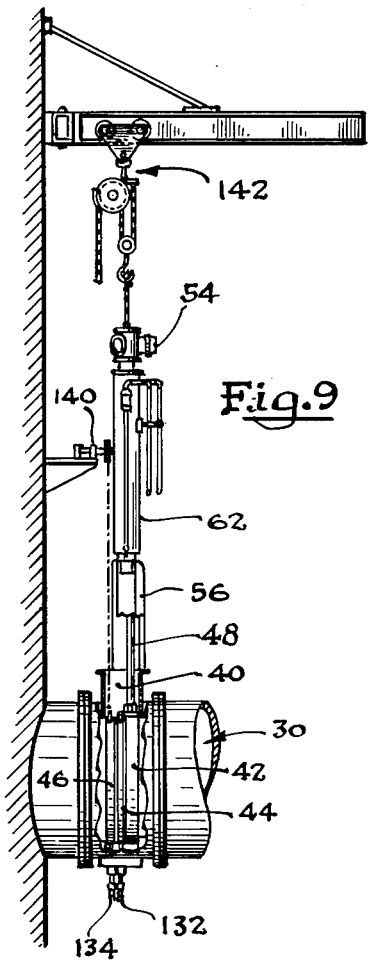

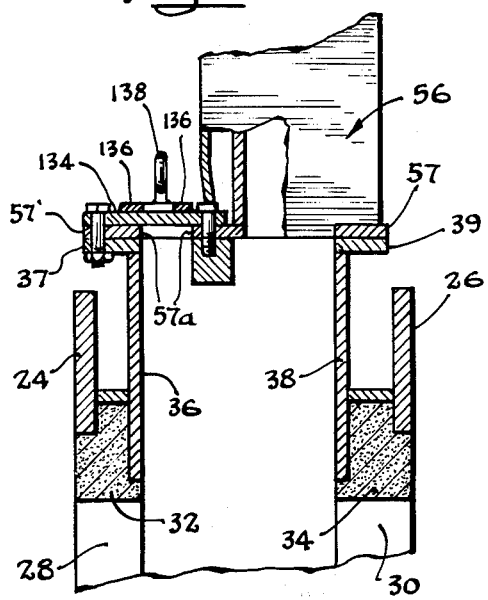
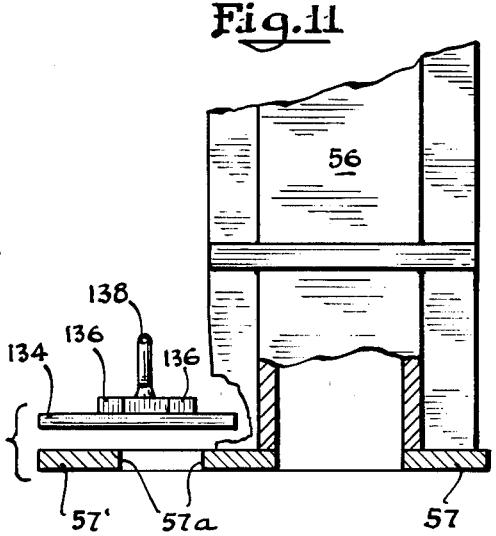
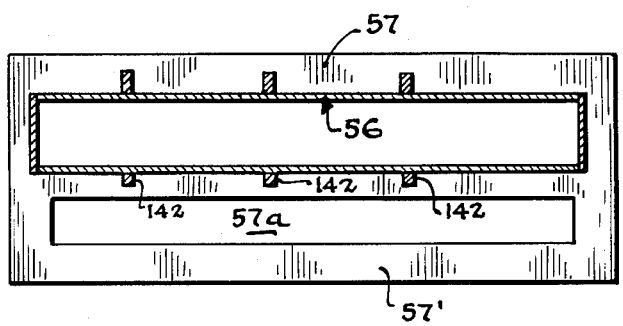
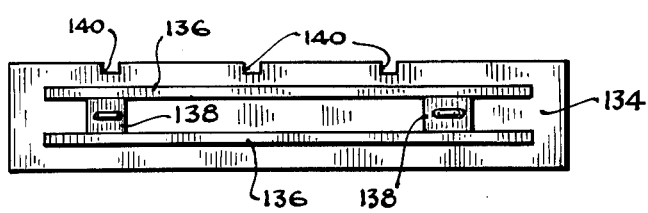
Inventor
FRANK A. BERCZYNSKI
By George E. Frost - Keith J. Kulie
Attorneys United States Patent Office 3,207,174
Patented Sept. 21, 1965

The present invention relates to a valve and more particularly it relates to an improved fluid cooled valve construction that permits convenient assembly and repair.

Valves of the type disclosed herein are employed, for example, in the large conduits associated with the hot blast stoves in blast furnace installations. The air being conveyed along such lines may reach temperatures around 2000° F. For this reason it is essential that the valves be cooled by circulation of fluid through the internal valve parts. Without cooling of the valve parts the valve life would be seriously affected and it is doubtful that the valve would operate in any event due to the expansion that would occur upon heating of the movable portions of the valve. Further, the valves generally are of very large size since the hot air conduits frequently are several feet and more in diameter. Large valves of this type are very difficult to handle. Generally motorized valve operators are provided to move the valve gate between valve open and valve closed positions since the gate, with the auxiliary mechanism, is very heavy. If the gate were to be manually operated the gear ratios required to get the torque down to a reasonable operating level would require many turns of the operating handle and to this extent opening and closing of the gate would be slow and very tiring upon the operators assigned to open and close the valve. Motor operation permits easy and quick opening and closing from remote positions and also releases manpower for other tasks that cannot conveniently or economically be handled by mechanized equipment.

The very hot air being handled in such fluid conduits may contain abrasive particles which will give rise to abrasive wear upon the seating surfaces of the seat rings, gate and seating faces upon the valve port. Further, operation of the valve gate itself results in abrasive sliding action of metal parts with respect to each other such that in time the seating faces on the sealing portions of the valve become worn and no longer are able to define a fluid sealing relation therebetween. When such a condition has deteriorated to a predetermined level it is necessary to replace the worn seating faces.

Since valves of the type disclosed herein are very large and heavy the construction generally is arranged such that the major portion of the abrasive wear action upon opening and closing of the valve will occur upon the seat ring of the valve. Thus if the seat ring sealing face becomes worn it is necessary either to turn the ring around and expose a new sealing face to the gate wall or to remove the ring entirely and insert a new ring. The fluid cooled seat ring itself is large, difficult to handle, and because of its size is relatively heavy.

In present valve constructions of the type herein noted rotation or replacement of the seat ring involves removal of the valve bonnet in order to expose the internal valve chamber thereby to provide access to the seat ring and the other internal components of the hot blast stove valves. The valve bonnet of such valves is a very large component of the valve structure and, of course, is secured and bolted to the valve body and in relation to the motorized valve operator and auxiliary equipment. Removal of the entire valve bonnet to provide access to the internal chamber of the valve is a major, time consuming operation.

The present invention is directed to an improved fluid cooled valve construction that permits removal of the valve seat ring and spacer ring without removal of the valve bonnet. The construction involves the provision of a ring opening in the valve body wall. The ring opening is sealingly covered with a hatch member that is relatively small and readily removed from the ring opening to provide access to the seat and spacer rings in the internal valve chamber to permit removal of said rings from the chamber. Thus, the seat ring may be removed from the chamber without removal of the large and heavy valve bonnet.

It, accordingly, is a general object of the present invention to provide an improved valve construction.

Another object of the present invention resides in the provision of an improved fluid valve construction wherein the fluid cooled valve seat and spacer units may be removed from the internal valve chamber without removal of the large valve bonnet.

A further object of the present invention resides in the provision of an improved valve construction wherein the valve seat unit and valve spacer unit may be repaired or replaced conveniently.

An additional object of the present invention resides in the provision of an improved hot blast stove valve construction wherein access is conveniently provided into the internal valve chamber through means other than the valve bonnet.

Another object of the present invention resides in the provision of an improved valve construction that is economical to manufacture, and that is convenient to install, use and service.

The novel features which I believe to be characteristic of my invention are set forth with particularity in the appended claims. My invention itself, however, together with further objects and advantages thereof, will best be understood by reference to the following description taken in connection with the accompanying drawings, in which:

FIGURE 1 is a front elevational view of the valve of the present invention shown in combination with the valve operator unit;

FIGURE 2 is a side view of the valve of FIGURE 1;

FIGURE 3 is a slightly enlarged view of the internal valve chamber of the valve of FIGURE 1, illustrating the relation of the internal valve units;

FIGURE 4 is a front view, partly in section, of the valve seat component of the present valve construction;

FIGURE 5 is a view, partly in section, showing in detail the construction of the valve gate of the valve of the present invention;

FIGURE 6 is a fragmentary sectional view taken along lines 6—6 of FIGURE 5;

FIGURE 7 is a sectional view taken along lines 7—7 of FIGURE 4 showing the internal fluid cooling chamber of the valve seat component;

FIGURE 8 is a sectional view of the spacer component of the valve of FIGURE 1;

FIGURE 9 is a view of the valve of the present invention showing the associated valve repair units;

FIGURE 10 is a fragmentary view, partly in section, of the upper portion of the valve body showing the ring opening and hatch;

FIGURE 11 is a fragmentary view of the valve bonnet showing the bonnet flange and hatch adapted to cover the ring receiving opening of the valve body;

FIGURE 12 is a top view, partly in section, of the valve bonnet; and

FIGURE 13 is a top plan view of the hatch.

Referring more particularly now to FIGURES 1 and 2 of the drawings, the valve of the present invention is illustrated generally at 20. The body of valve 20 is defined by an outer wall 22 having flanges 24 and 26 affixed at either end thereof. The valve body defines valve ports 28 and 30. The inner periphery of the wall 22 is provided with a suitable insulating material or fluid cooling chambers 32 and 34 to provide thermal protection for the casing defining said body. It should be observed that the valve body may be exposed to temperatures as high as 2000° F. in use in blast furnace installations. To avoid the use of expensive alloys in the construction of the valves it becomes expedient to provide a suitable thermal barrier on the interior wall of the valve to insulate the metal valve wall during use.

A pair of partition members 36 and 38 are affixed to the outer wall 22 of the valve 20 in relative spaced relation intermediate the terminal portions of the wall 22 as defined by the flanges 24 and 26. The partition members 36 and 38 are in mating relation along the sides thereof to define a fluid seal therealong. The members 36 and 38 extend upwardly projecting above the upper periphery of the wall 22 and terminate in outwardly flaring shoulders 37 and 39.

The internal valve chamber 40 extends slightly below the lower periphery of the wall 22 of the valve 20 and defines a lower chamber portion 40a.

A bleed valve 41 is connected to the chamber 40a to provide a means for drawing off any foreign matter, fluid or condensate that may collect in that chamber.

A valve gate unit 42, valve seat 44 and spacer units 46 are operatively positioned within the internal valve chamber 40 of the valve 20. The valve spacer unit 46 and valve seat unit 44 are generally ring shaped and are disposed within the internal valve chamber in substantially coaxial relation with the longitudinal axis defined between the ports 28 and 30 of the valve. The inner periphery of the seat and spacer units, 44 and 46 respectively, define an extension of the port diameter 28 as defined by the inner periphery of the insulating body 32 disposed about said port.

The valve gate unit 42 is adapted to be moved into and out of registration with the port 30 to prevent or permit flow through the valve 20. The upper portion of the valve gate 42 is operatively connected to the lower terminal of a valve stem 48. The valve stem 48 extends away from the gate and is connected at its other terminal to a valve operating stem 50. The stem 50 is rotatably mounted by suitable bearing members 52. The stem 50 is connected at its opposite end to a valve operating unit 54. The valve operating unit 54 may be an electric, pneumatic or hydraulic motor of a common type well known to the art having a rotatable shaft operatively connected through suitable gear reduction or power means to the shaft 50. The valve operator 54 preferably is provided with means to permit either manual or power operation of the valve through the same drive mechanism defined through the stem 50 and stem 48. To this extent means may be provided to engage or disengage only the electric, pneumatic or hydraulic power means or the like associated with the operating unit thereby to permit manual control and operation of the valve gate 42.

A valve bonnet 56 is adapted to be affixed to the outwardly flaring shoulder portions 37 and 39 of the partition members. The valve bonnet defines an extension of the internal chamber 40 of the valve 20 and is adapted to receive the stem 48 and the gate 42 when the gate is withdrawn and out of registration with the valve port 30. The bonnet is provided with a flange 57 at the base thereof to provide means for affixing said bonnet to the flanges 37 and 39 of the partition members.

The flange 57 extends outwardly about all sides of the upstanding portion of the bonnet to define a mating surface to the entire periphery of the flanges 37 and 39 when mounted thereto. As indicated in FIGURES 2 and 3 the bonnet is positioned over the integral valve chamber. The flange 57 extends outwardly a relatively greater distance along one side of the bonnet, as indicated at 57′, to provide a mating surface extending over the flange 37 of the partition unit 36. The flange 57′ of the bonnet is provided with an opening 57a extending into the internal chamber 40 of the valve 20. The mating flanges of the bonnet and the partition members, respectively, may be affixed to each other by bolting or other conventional fastening means.

An opening 58 is provided at the top of the bonnet 56 to receive the stem 48 therein. The interfacial area defined between the stem 48 and the opening 58 is provided with a suitable seal (such as an O-ring, or the like) to provide a fluid seal therebetween and prevent the escape of fluid or gases about the periphery of the stem as it extends through said opening. It should be observed that the stem moves with respect to the periphery of the opening 58 so that a dynamic seal must be provided in this area.

A pair of rings 60 are welded to the upper surface of the bonnet 56 to provide a convenient means for lifting the bonnet from the valve body proper, as described hereinbelow.

A stem casing 62 extends above the bonnet 56 of the valve, said casing being mounted to the upper surface of the bonnet on a suitable support structure. The casing may also be independently supported along its length for additional support in view of the fact that it carries part of the weight of the valve operator unit 54. Yoke 68 is affixed to the casing 62 of the valve. The casing 62 therefore holds yoke 68 against rotation. The valve operator unit 54 is mounted to the opposite end of the stem casing 62, said unit 54 being operatively attached to the stem 50 of the valve operating assembly.

A manual valve operator 64 may be mounted to the valve body as illustrated in FIGURE. 1. The wheel 65 of the manual operator 64 is connected through suitable gearing means and the torque rods 66 to the valve operator 54 at the top of the valve assembly. Thus when the motor operator is not functioning the valve operator 54 may be switched to manual operation and the opening and closing of the valve gate controlled through operation of the wheel 65 of the manual valve operator 64. It should be observed that the rods 66 may extend away from the valve to provide for remote positioning of the manual valve operator 64.

Hose mounting and support means are affixed to the upper portion of the bonnet and to the casing 62 of the valve operating assembly. As indicated in FIGURE 1 a yoke 68 is mounted directly to the upper surface of the valve bonnet 56. The yoke 68 supports fluid conveying hoses 70 and 72 connected to the valve disc or gate 42. Flexible hose extensions 73 and 71 are connected in fluid tight relation to the upper terminals of the hoses 70 and 72, respectively, and are supported by the yoke 68 of the assembly. The flexible hoses 71 and 73 are supported above the upper surface of the bonnet 56 by a second yoke member 76 said hoses extending to a suitable source of fluid coolant (not shown).

The valve seat member 44 defines a ring-like rectangular member as more clearly shown in FIGURES 4 and 7. The ring defines an internal chamber 78 adapted to carry coolant fluid therein. The internal chamber 78 is not defined completely about the seat ring 44 there being a partition 80 adjacent the bottom periphery thereof. Fluid access ports 82 and 84 are defined adjacent the partition 80 on either side thereof, respectively. If the fluid coolant assembly is connected such that fluid is introduced into the port 82, the fluid will traverse the chamber 78 about the entire inner ring surface and will exit from the chamber through the port 84 thus cooling the entire inner surface of the valve seat ring 44.

A yoke 86 is affixed to the ring 44 at the upper periphery of the ring, said yoke defining two ears 88 and 90 at either terminal thereof. The ears of the yoke 86 are adapted to receive a cable or other lifting device such as a hook member or the like to provide convenient means for lifting the valve seat member 44 to facilitate positioning thereof in the internal valve chamber 40 of the valve 20. It should be noted that the ring 44 may be provided with a lift ring of the type illustrated in conjunction with the hatch cover 134, FIGURE 13. A pair of positioning pins 92 are mounted to the valve ring at opposed positions thereon. The pins 92 are adapted to engage mating positioning means 94 within the valve body to facilitate and assure positive positioning of the valve seat 44 with respect to the valve body and with respect to the space and valve disc within the internal chamber.

The valve spacer ring 46 is of the same general configuration as the seat ring 44. The spacer ring 46 defines an internal chamber 96 adapted to carry coolant fluid therein. The internal chamber of the ring 46 does not extend in a continuous ring through the inner portion of the spacer in that it is divided by a partition in the same manner as that illustrated for the seat ring 44. Fluid access ports 98 are provided on either side of the internal chamber of the partition of the spacer ring 46. The spacer ring 46 is provided with positioning pins 100 along the outer periphery thereof said pins 100 adapted to be in mating relation with positioning lugs 102 within the valve body when the spacer ring 46 is inserted in the internal chamber 40 of the valve body. The spacer ring 46 further defines a slightly raised seat bearing area 104 along one wall thereof. This seat bearing area 104 is adapted to be in mating sealing relation with the valve body seat wall defined by the partition 36 when the valve disc is in valve closed position.

The fluid cooled valve disc 42 of the valve disclosed herein is defined by two parallel spaced plates 106 and 108 joined at the outer periphery thereof to define a circular inner chamber therebetween. As illustrated in FIGURE 5 of the drawings the disc 42 is provided with a pair of openings 110 and 112 in fluid connection with the inner chamber defined within the disc. The inner chamber of the disc 42 may be defined by a first deflection plate 114 in fluid tight communication with the outer periphery of the parallel plates 106 and 108 as indicated at 113 and curving upwardly is spaced relation to the inner periphery of the inner chamber of the disc, as illustrated. The deflection plate 114 may extend wholly across the inner chamber of the disc to direct the flow of fluid coolant upwardly along the plate. A second deflection plate 116 extends substantially from the fluid port 112 of the disc 42 about the chamber in substantially uniformly spaced relation to the inner periphery of the chamber and terminating at a point short of full development about said inner periphery. The plate 116 is joined to the fluid wall at one terminal at a point 117 between the fluid access ports 110 and 112 and in spaced relation to the end 115 of the first deflection plate 114. It is seen therefore that the plates 114 and 116 define a chamber extending from the port 110 upwardly (to the left in FIGURE 5) along the plate 114 and then along the chamber 120 defined between the plate 116 and the inner periphery of the disc 42.

A third deflection plate 122 is positioned within the inner chamber along a plane extending from the inner periphery of the disc and between the terminal 117 of the plate 116 and the port 112 of the disc. The plate 122 therefore divides the remaining portion of the chamber so that deflection of the fluid occurs therein. The complete fluid path thus defined extends from the port 110, into the chamber 120, into the area below the deflection plate 122, then around the deflection plate 122 into the area thereabove and into the port 112 and fluid connection 70 of the disc 42. It thus is seen that the fluid coolant is circulated about the entire inner surface of the disc and is brought into cooling contact with the entire inner plate area of the disc to remove heat from the same and to keep the gate members at a predetermined safe operating level for the intended use.

The plates 106 and 108, as indicated hereinabove, are joined at their outer periphery by an annular member 124 as indicated in FIGURE 6 of the drawings. The terminals 124a and 124b of the member 124 extend outwardly beyond the outer faces of the plates 106 and 108 to define seating surfaces for the disc 42. Randomly positioned rods may be mounted between plates 106 and 108 to provide additional support members therebetween to minimize any tendency of the disc to deform.

A pair of guiding lugs 126 and 128 are affixed to the disc at the outer periphery thereof, each of said lugs extending outwardly from the outer surfaces of said disc. The lugs 126 and 128 are adapted to engage a pair of lugs 130 on the body of the valve in mating relation therewith to position the gate or disc within the valve body in fluid sealing relation therein.

As illustrated in FIGURE 3 of the drawings the valve spacer 46, valve seat 44 and valve disc 42 are assembled within the valve chamber 40 of the valve illustrated and described herein. The valve spacer member 46 is positioned within the chamber 40 adjacent the partition 36 of the valve and the inner periphery of said spacer member defining an extension of the port 28 of the valve. The seating face 104 of the spacer member 46 extends about the periphery of the opening defining the port 28 in the valve body wall. The valve seat member 44 is positioned adjacent the valve spacer member inwardly thereof in the chamber 40 of said valve. The valve seat member 44 defines flat sealing faces 45 and 47 along the outer faces thereof as illustrated in FIGURE 7 of the drawings. The valve spacer 46 and seat 44 are positioned within the internal chamber of the valve body by the lugs thereon being brought into mating positioning relation with the lugs on the valve body. As illustrated in FIGURE 3 of the drawings, the spacer 46 is urged into fluid sealing engagement with the opening defining the port 28 of the valve. The seat 44 is urged into sealing engagement with the spacer 46, the inner periphery of the seat ring defining a further extension of the port 28.

As illustrated in FIGURE 3, the fluid connections from the openings 82 and 84 of the valve seat member 44 and from the fluid connection 98 of the valve spacer member 46 extend outwardly from the valve chamber 40 at the bottom thereof. Fluid connections 133 extend from each of the openings of the spacer member 46 while fluid connections 132 extend from each of the openings of the seat 44. The pairs of fluid connectors 132 and 133 are spring biased towards fluid sealing engagement with the openings in the spacer and seat members.

The valve stem 48, as described hereinabove, extends into the chamber 40 from the bonnet 56 of the valve disclosed herein. The stem is operatively connected at one end thereof to the upper portion of the valve disc 42 and at the other end thereof to the valve operator member 54. The valve disc 42 is disposed within the chamber 40 of the valve in position between the inner terminal of the valve port 30 and the seat member 44. The valve disc, of course, is operatively disposed between the valve open position wherein the disc 42 will be out of registration with the valve port 30 and the valve closed position (illustrated in FIGURES 2 and 3) wherein the valve disc 42 will be in registration with the valve port 30 to shut off flow through the valve member.

When the valve disc 42 is in position to define the valve opened position it will be withdrawn up into the bonnet 56 of the valve structure to an extent such that the lower periphery of the valve disc 42 will be totally out of registration with the valve port 30 of the valve body. In this manner full free flow is provided through the valve proper.

The valve bonnet 56, bonnet flange 57 and 57', open hatch and hatch cover all are illustrated in FIGURES 10, 11, 12 and 13 of the drawings. As shown, the bonnet 56 is affixed to the mating flanges of the valve body proper to provide a rigid interconnection therebetween. The bonnet preferably is bolted to the valve body flanges in order to provide for convenient removal of the bonnet if required.

The valve flange 57' is provided with a ring removal opening 57a, shown more clearly on FIGURE 12 of the drawings. The ring removal opening 57a is of sufficient length and width to assure room to pass the spacer ring 46 and the seat ring 44 therethrough. With the bonnet 56 bolted in position upon the flanges 37 and 39 of the valve body the ring removal opening 57a is adapted to extend into the inner chamber 40 of the valve body in position adjacent the valve port 28 of said body. In this position the opening 57a is spaced above the position of the spacer ring 46 and the valve ring 44 when said rings are in position within the inner chamber of the valve.

A hatch cover 134 is provided to be positioned over the opening 57a when the valve is fully assembled and in service. The cover 134 may be bolted to the flange 57' of the bonnet or secured in some other manner that will permit convenient removal of the cover from the bonnet flange. The hatch cover 134 is provided with a pair of longitudinally extending strips 136 to reinforce the cover and provide means to affix additional support for the hatch removal rings 138. The hatch cover member 134 illustrated in FIGURE 13 of the drawings is provided with a series of recesses 140 adapted to be received about the projections 142 of the upstanding portion of the bonnet 56.

It frequently is necessary during the service period of the valve in the hot fluid lines to change the seat member 44 or the spacer member 46 in view of the fact that the sealing surfaces of these members becomes eroded during use and fail to define a tight fluid seal with the mating portions of the valve members or valve body. To this extent it has been the practice with prior constructions to remove the entire valve bonnet with a suitable crane or other lifting means, remove the valve spacer member and seat member, and replace the worn parts. On some occasions it is necessary only to rotate the spacer or seat members to provide a new sealing surface to the mating sealing member. On other occasions it is necessary to replace the entire spacer or seat ring.

With the valve construction disclosed herein the valve spacer member and valve seat member may conveniently be rotated or changed in the following manner. The valve disc first is driven to the full open position (FIGURE 9). The hatch cover 134 is then unbolted and removed from over the opening 57a of the bonnet flange 57'. The spacer 46 and seat water connections then are removed. The seat positioning lugs 94 and 102 of the valve body are adapted to be rotated with respect to the valve body. During removal of the seat 44 and spacer 46 of the valve assembly, the rotatable positioning lugs 94 and 102 are rotated until the inclined plane defined by each is substantially parallel with the horizontal plane defined through the axis of the valve assembly. In this manner the lugs 94 and 102 are moved to the horizontal position as the valve is viewed in FIGURE 3. With the seat positioning lugs in this position the seating pressure engagement between the seat, spacer and valve body, respectively, is relieved. The removal of the spacer and disc with these seating pressures relieved is readily accomplished. In this manner of removal the seat may remain in the body in position while the valve spacer member is removed from the body. The cable from the crane 140 is then lowered over the yoke 86 and 88 of the seat and the seat lifted to clear the seat positioning lugs 94 thereby permitting the seat to be moved out of engagement with the spacer 46. The seat is suspended in this position with a suitable sling attached to the valve body and the crane cable removed from the seat yoke 86 and 88. The cable of the crane 140 is then positioned about the yoke member (said spacer 46 having a yoke similar in construction to that illustrated and described for the seat ring 44) and the spacer lifted out of the inner chamber 40 of the valve through the ring opening 57a of the bonnet 56. The seat 44 is next removed from the opening and both the spacer and seat ring replaced with new units if required. The sealing surface of the spacer with respect to the seat ring is on a different diameter than the sealing surface of the valve disc with respect to the seat ring so that the seat ring may be rotated to provide new sealing surfaces to the spacer and valve disc.

Prior valve constructions require removal of the complete bonnet assembly with a crane 142, as illustrated in FIGURE 9. In this method it also is necessary to disconnect the motor-stem connections. It can readily be seen that the task of replacing the spacer and seat units with this construction is a very difficult operation requiring the handling of very large pieces of equipment and partial disassembly of the valve proper.

Replacement of a valve seat with the construction disclosed herein involves lifting the relatively small hatch cover 134 from the flange 57' and then removing only the valve spacer member and the seat member which is to be replaced. With this construction complex partial disassembly of the valve is not required and the large and heavy valve bonnet remains in position on the valve at all times.

While I have shown and described a specific embodiment of the present invention it will, of course, be understood that other modifications and alternative constructions may be used without departing from the true spirit and scope of this invention. I therefore intend by the appended claims to cover all such modifications and alternative constructions as fall within their true spirit and scope.

What I claim as new and desire to secure by Letters Patent of the United States is:

1. An improved fluid cooled valve adapted to be interposed in a materials conveying conduit to control the flow of materials therealong, said valve comprising:

a valve body having an inlet and an outlet port and an internal chamber therebetween with seating faces defined about the inner terminals of said ports, said internal chambers extending orthogonally to the longitudinal axis between said ports;

a valve gate received in said chamber and adapted to be moved into and out of registration with one of said valve ports, a fluid seal being defined between one wall of said gate and the adjacent seating face when said gate is in registration with said one of the valve ports;

a seat ring disposed in the chamber adjacent the other wall of said gate;

a spacer ring disposed in the chamber between the seat ring and the other of said ports, said spacer ring, seat ring and gate each having open internal chambers;

a bonnet affixed to said valve body receiving opening and defining a chamber contiguous with said valve body internal chamber, said bonnet having a flange integral therewith extending over said valve body internal chamber, said flange having a ring opening therein substantially aligned with the position of said spacer and seat rings in the internal valve chamber;

a stem operably connected at one end to stem operating means and at the other end to the valve gate, said stem extending into the internal valve chamber and the bonnet; and a cover plate adapted to be positioned over the ring opening in the flange and to be releasably secured thereto, whereby upon removal of the cover the spacer ring and seat ring may be fully withdrawn from the internal valve chamber through the ring opening and flange opening.

2. An improved fluid cooled valve adapted to be interposed in a materials conveying conduit to control the flow of materials therealong, said valve comprising:

a valve body defining an inlet and an outlet port with an internal valve chamber therebetween and a housing extending into said internal valve chamber, the general axis of said housing being orthogonally related to the longitudinal axis defined along said inlet and outlet ports, said valve body having valve seating faces at the juncture of said inlet and outlet ports and said valve chamber, respectively;

a valve gate operably disposed within said internal valve chamber, said gate in one position being fully disposed across one of the valve ports, one wall of the gate being in fluid sealing relation with the valve seating face at the juncture of said one of said valve ports and the internal chamber, said gate in another position being fully withdrawn from disposal across said one of the valve ports;

a valve seat ring disposed in said internal valve chamber in spaced relation to said one of the valve ports, said seat ring adapted to be in fluid sealing engagement with the other wall of said valve gate when the valve gate is disposed across said one of the valve ports;

a spacer ring adapted to be disposed in the internal valve chamber in axially aligned relation to said seat ring, said spacer ring being positioned within said chamber between the seat ring and the other of said valve ports said spacer ring being in fluid sealing relation with the seat ring and the seating face at the juncture of the other port and the valve chamber, said spacer ring seat ring and gate defining open internal conduits adapted to receive a fluid coolant;

a bonnet affixed to said valve body over the housing defining a chamber continuous with said housing, said bonnet having a flange integral therewith and adapted to extend over the housing, said flange having an opening therein substantially aligned with the position of said spacer and seat rings in the internal valve chamber;

a stem operably connected at one end to step operating means and at the other end to the valve gate, said stem extending into the internal valve chamber and the bonnet; and a cover plate adapted to be positioned over the opening in the flange and to be releasably secured to said flange, whereby upon removal of said cover plate the spacer ring and seat ring may be fully withdrawn from the internal valve chamber through the housing and the opening in said flange.

3. An improved fluid cooled valve adapted to be interposed in a materials conveying conduit to control the flow of materials therealong, said valve comprising:

a valve body having an inlet and an outlet port and an internal chamber therebetween with seating faces defined about the inner terminals of said ports, said valve body defining an opening in the upper wall of the chamber, said opening extending orthogonally to the longitudinal axis extending between said ports;

a valve gate received in said chamber and adapted to be moved into and out of registration with one of said valve ports, a fluid seal being defined between one wall of said gate and the adjacent seating face when said gate is in registration with said one of the valve ports;

a seat ring disposed in the chamber adjacent the other wall of said gate;

a spacer ring disposed in the chamber between the seat ring and the other of said ports, said spacer ring seat ring and gate each having open internal chambers; and a cover plate adapted to be positioned over the opening in the body wall and to be releasably secured thereto, whereby upon removal of the cover plate the spacer ring and seat ring may be fully withdrawn from the internal valve chamber through the opening in the valve body wall.

4. An improved valve adapted to be interposed in a materials conveying conduit to control the flow of materials therealong, said valve comprising:

a valve body having an inlet and an outlet port and defining an internal chamber therebetween open at the top with seating faces defined about the inner terminals of said ports;

a valve gate received in said chamber and adapted to be moved into and out of registration with one of said valve ports;

operating means associated with said valve gate;

a stem operably connected at one end to the operating means and at the other end to the valve gate, said stem extending into the internal valve chamber through said valve body opening;

a seat ring disposed in the chamber in position adjacent the wall of said valve gate away from said one of said valve ports;

a spacer ring disposed in the internal chamber between the seat ring and the other of said ports;

a bonnet affixed to said valve body over said valve body opening and defining a chamber contiguous with said internal chamber, said bonnet having a flange integral therewith and adapted to extend over the opening of the valve body, said flange having a ring opening therein contiguous with the opening of the valve body; and a cover plate adapted to be positioned over the ring opening in the flange and to be releasably secured thereto, whereby upon removal of the cover the spacer ring and seat ring may be fully withdrawn from the internal valve chamber through the ring and flange openings.

5. An improved fluid cooled valve adapted to be interposed in a materials conveying conduit to control the flow of materials therealong, said valve comprising:

a valve body having an inlet and an outlet port and defining an internal chamber therebetween open at the top with seating faces defined about the inner terminals of said ports;

a valve gate received in said chamber and adapted to be moved into and out of registration with one of said valve ports;

operating means associated with said valve gate;

a stem operably connected at one end to the operating means and at the other end to the valve gate;

a seat ring disposed in the chamber in position adjacent the wall of said valve gate from said one of said valve ports;

a spacer ring disposed in the internal chamber between the seat ring and the other of said ports, said valve gate, seat ring and spacer ring each having an open internal chamber and fluid inlet and outlet ports connected thereto to provide for circulation of coolant fluid through said members;

a bonnet affixed to said valve body and defining a chamber contiguous with said internal chamber, said bonnet having a flange integral therewith and adapted to extend over the opening of the valve body, said flange having a ring opening therein contiguous with the opening of the valve body; and a cover hatch adapted to be positioned over the ring opening in the flange and to be releasably secured thereto, whereby upon removal of the cover the spacer ring and seat ring may be fully withdrawn from the internal valve chamber through the ring and flange openings.

References Cited by the Examiner

UNITED STATES PATENTS

| 1,995,727 | 3/35 | Wetherbee | 137—340 |
| 2,165,036 | 7/39 | Eaton et al. | 251—328 |
| 3,113,585 | 12/63 | Kinney et al. | 137—315 |

ISADOR WEIL, *Primary Examiner.*

WILLIAM F. O'DEA, *Examiner.*